United States Patent [19]

Hsiue et al.

[11] Patent Number: 4,927,890

[45] Date of Patent: May 22, 1990

[54] SYNTHESIS OF BIGRAFT COPOLYMERS BASED ON GRAFTED TYPE PERACID POLYMER

[75] Inventors: Ging-Ho Hsiue; Wen-Kuei Huang, both of Hsinchu, Taiwan

[73] Assignee: National Science Council, Taipei, Taiwan

[21] Appl. No.: 248,034

[22] Filed: Sep. 23, 1988

[51] Int. Cl.$^5$ .................... C08F 255/02; C08F 265/02
[52] U.S. Cl. ..................................... 525/301; 522/114; 525/279; 525/285; 525/303; 525/309; 525/311; 525/329.7
[58] Field of Search ...................... 525/329.7, 301, 285, 525/279

[56] References Cited

U.S. PATENT DOCUMENTS

| | | | |
|---|---|---|---|
| 3,900,530 | 8/1975 | Crawford | 525/301 |
| 4,735,736 | 4/1988 | Chung | 525/301 |
| 4,774,280 | 9/1988 | Hauschild et al. | 525/301 |

FOREIGN PATENT DOCUMENTS 1215667  9/1986  Japan ................................ 525/285

Primary Examiner—Wilbert J. Briggs, Sr.
Attorney, Agent, or Firm—Bacon & Thomas

[57] ABSTRACT

The present invention relates to a method of synthesizing a bigraft compolymer based on grafted type peracid polymer, which comprises graft polymerizing a first ethylenically unsaturated monomer containing a carboxyl group onto a polymer substrate having a form of a membrane, particulate or tube; oxidizing the carboxyl groups of the resulting graft polymer into peracids; and then graft polymerizing a second ethylenically unsaturated monomer onto the grafted chain of the graft polymer through the decomposition of the peracid. Surface profile and morphology of the bigraft copolymer membrane product is also investigated by scanning electron microscopy and transmission electron microscopy respectively.

15 Claims, 7 Drawing Sheets

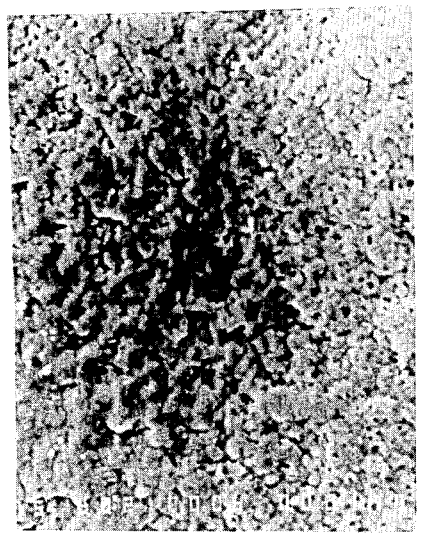
FIG. 6(a)  ⊔1μ⊔
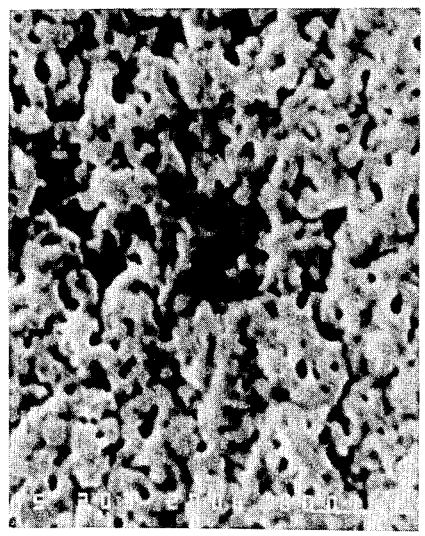
FIG. 6(b)  ⊔1μ⊔
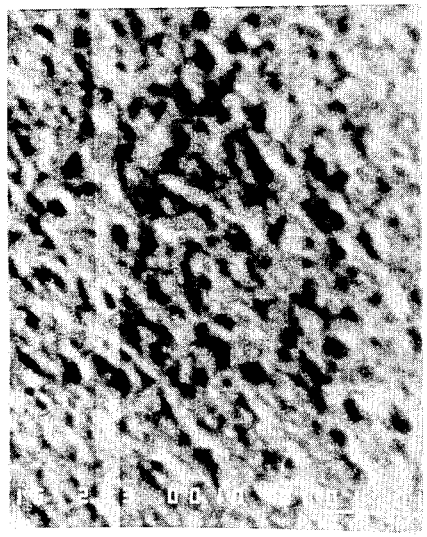
FIG. 6(c)  ⊔1μ⊔
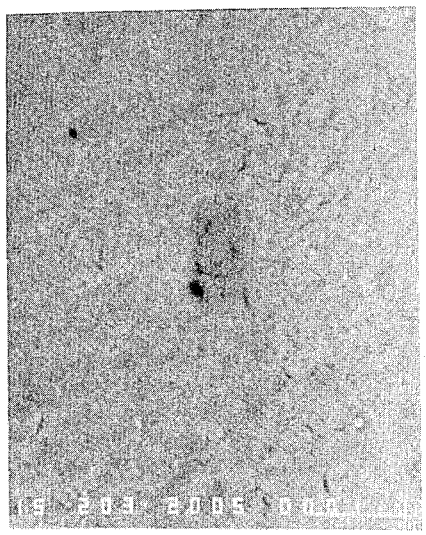
FIG. 6(d)  ⊔1μ⊔

FIG. 7(a)  ⌊1μ⌋
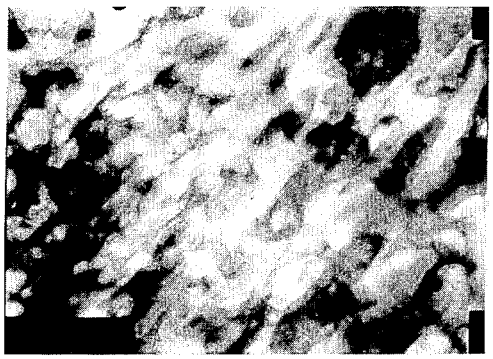
FIG. 7(b)  ⌊1μ⌋
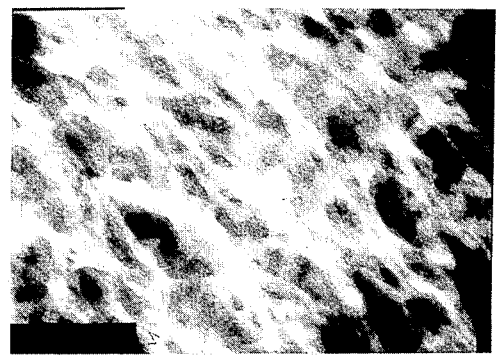
FIG. 7(c)  ⌊1μ⌋
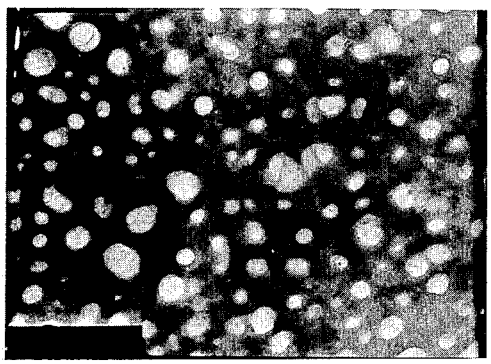
FIG. 7(d)  ⌊1μ⌋
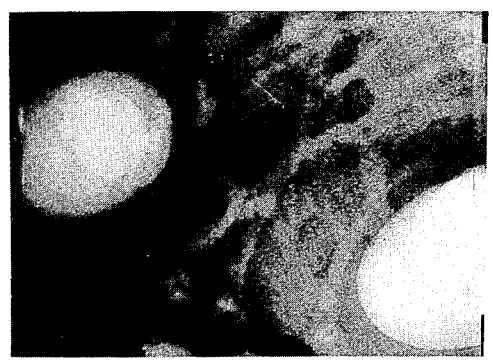
FIG. 7(e)  ⌊1μ⌋

SYNTHESIS OF BIGRAFT COPOLYMERS BASED ON GRAFTED TYPE PERACID POLYMER

BACKGROUND OF THE INVENTION

F. Helfferich and D. B. Luten, J. R., "Oxygen-Transfer Resins, a New Type of Oxidation-Reduction Polymers", J. Appl. Polym. Sci., 8, 2899 (1964) first disclose the preparation of a peracid type resin and the utilization of the peracid type resin as an oxygen-transfer resin due to its reactivity with olefins to form diols. They oxidize bifunctional cation exchangers containing carboxylic and sulfonic acid groups with aqueous hydrogen peroxide which converts the carboxylic acid to percarboxylic acid.

T. Takagi, "Epoxidation with Peracid Type Polymer". Journal Polym. Sci., Polym. Lett., 5, 1031 (1967) discloses an epoxidation method for olefinic compounds by using a percarboxylic acid type resin, in which the percarboxylic type resin is prepared by oxidizing a commercially available carboxylic acid type cation exchanger with aqueous hydrogen peroxide.

T. Takagi, et. al., "Synthesis of Peracid-Type Resins by the Oxidation of Carboxylic Acid Type Resin with Hydrogen Peroxide in Sulfuric Acid Medium". J. Polym. Sci., Polym. Lett., 12, 681 (1974) and T. Takagi "Synthesis of Peracid-Type Resins and Their Characteristics as Oxygen Transfer Agents". J. Appl. Polym. Sci., 19, 1649 (1975) further study the preparation of a peracid type resin and its utilization in epoxidation of olefinic compounds. One major defect has been found that the peracid type resin is very instable during its application, i.e. detonation with great violence may occur, especially in dry state with oxidation capacity greater than 7 meq/g (in dry basis).

Besides their function of polymeric reagent for hydroxylation or epoxidation, K. koyama, et al., "Polymerization of Methyl Methacrylate Induced with the Peracid-Type Ion Exchange Resin", J. polym. Sci., A-1(9), 2439 (1971) disclose that the peracid type resins are effective as an initiator for polymerization of methyl methacrylate (MMA), in which the peracid type resin is prepared from a commercial ion exchanger (Amberlite IRC-50). It is found that part of the monomers are qrafted onto the resin, if the MMA was polymerized by bulk polymerigation. But when the MMA is solution polymerized, a homopolymer of MMA is obtained. The homopolymerization is of concern, especially the kinetic study.

SUMMARY OF THE INVENTION

According to the present invention a bigraft copolymer substrate having a form of a membrane, particulate or tube can be prepared by a two-stage graft polymerizing process without any initiator being added. The two-stage graft polymerizing process comprises the following steps:

(a) graft polymerizing a first ethylenically unsaturated monomer containing a carboxyl acid group onto a polymer substrate having a form of a membrane, particulate or tube;

(b) oxidizing the carboxyl acid groups of the resulting graft polymer into percarboxyl acid groups; and (c) graft polymerizing a second ethylenically unsaturated monomer onto the grafted chain of the graft polymer through the decomposition of the peracid.

BRIEF DESCRIPTION OF THE DRAWING

FIG. 6 shows scanning electron micrographs of the surface of (a) EVA-g-AA, (b) EVA-g-AA, (c) EVA-g-AA-HEMA (140% grafted) and (d) EVA-g-AA-g-HEMA (560% grafted); and FIG. 7 shows transmission electron micrographs of (a) EVA sulfonated, (b) EVA-g-AA (105% grafted), (c) EVA-g-AA-g-HMMA (140% grafted), (d) EVA-a-AA-g-HEMA (560% grafted) and (e) EVA-g-AA-g-HEMA (560% grafted).

DETAILED DESCRIPTION OF THE INVENTION

Figure 1:
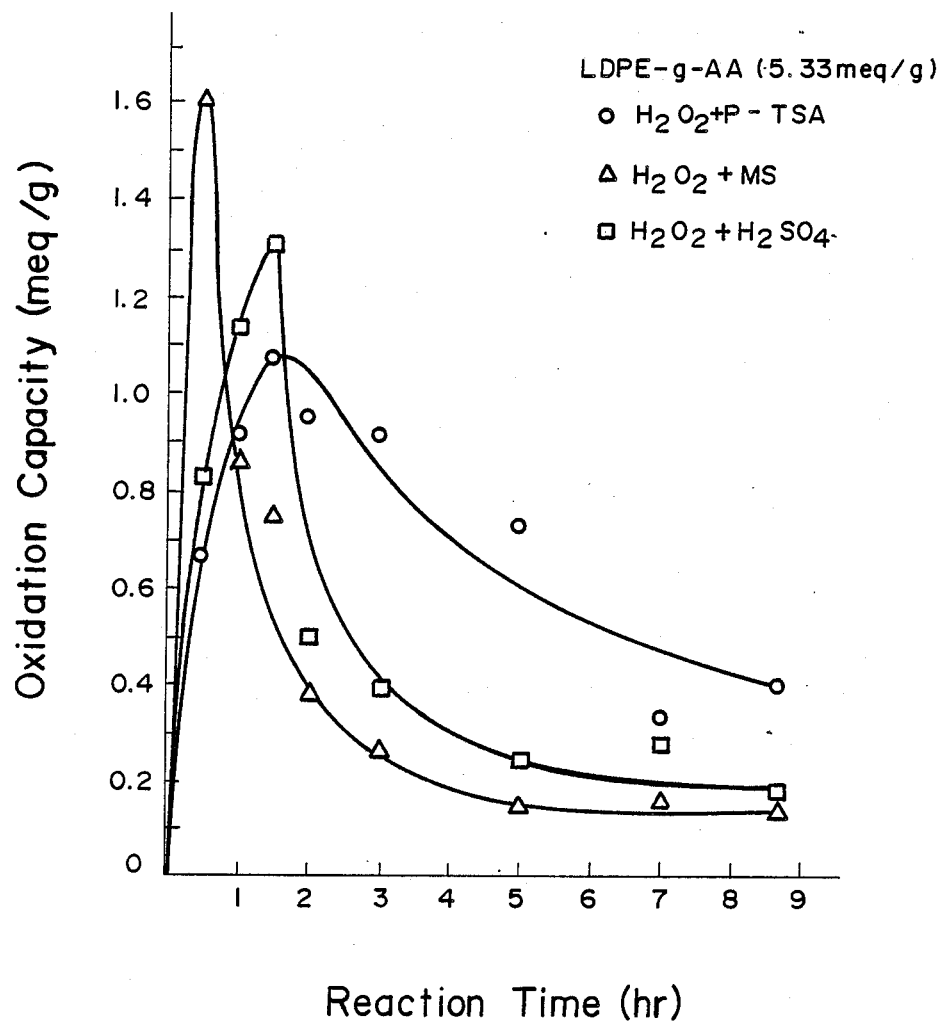
FIG. 1 is a plot of oxidation-capacity vs. reaction time for LDPE-g-AA (5.33 meq/g) oxidized with different acid catalysts at 60° C.

The graft polymerization in above step (a) can be carried out by any conventional method of graft polymerization, but preferably carried out by a preirradiation grafting method disclosed by the inventors in an article entitled, "Preirradiation Grafting of Acrylic and Methacrylic Acid onto Polyethylene Films; Preparation and Properties," J. Appl. Polym. Sci., 30, 1023 (1985), details thereof are incorporated by reference.

"Typically, an addition polymer or copolymer which can be cast or molded into membranes in flat film or tubular hollow form is suitable for use as the polymer substrate in above step a). Advantageously, the polymer substrate will be selected from those which substantially suffer no degradation under irradiation treatment, such as polyethylene, polyvinyl chloride, ethylene vinyl acetate copolymer, and polystyrene, etc.

Suitable monomers for use as the first ethylenically unsaturated monomer containing a carboxyl acid in above step a) include acrylic acid, methacrylic acid, ethylacrylic acid, crotonic acid, propiolic acid, styrene carboxyl acid, maleic anhydride, and fumaric acid, etc. In addition to these carboxyl acid group containing monomers, the ester type monomers derived therefrom may also be used in the graft polymerization, with the only requirement being that the resulting graft polymer undergo a hydrolysis treatment to convert the ester group into desired carboxyl acid group.

In above step (b), the carboxyl acid groups of the resultant graft polymer of above step a) are oxidized into percarboxyl acid groups by treating the graft polymer with a suitable oxidant, such as hydrogen peroxide, in the presence of an acid catalyst. Suitable acid catalysts include mineral acids such as sulfuric acid, and organic acids such as methanesulfonic acid and p-toluenesulfonic acid. During the conversion to percarboxyl acid, it has been found that there is a maximun conversion ratio due to the decomposition or hydrolysis rate of the resulting percarboxyl acid dominating over its generation rate after certain period of reaction time.

Additionally, the reaction temperature of the oxidation reaction should be limited to an extent less than about 100° C. in order to prevent the reaction from running violently, and preferably less than 60° C. to reduce the decomposition rate thereof.

The second ethylenically unsaturated monomer undergoes free radical polymerization with the grafted chain of the graft polymer of step (a) through the decomposition of the percarboxyl acid groups. Typically, the second ethylenically unsaturated monomer comprises styrene, methyl methacrylate, vinyl acetate, 2-hydroxyethyl methacrylate, vinyl pyridine, and vinyl pyrrolidone, etc.

The bigraft copolymers provided by the present invention have a general structure:

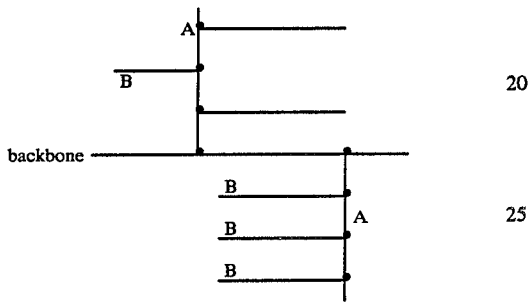

wherein A is the grafted chain formed by the first ethylenically unsaturated monomers, and B is the grafted chain formed by the second ethylenically unsaturated monomers. Compared to the "bigraft" copolymers taught by Kennedy in an article entitled, "J. P. Kennedy, "Synthesis, Characterization, and Properties of Block and Bigraft Copolymers", J. Polym. Sci., Polym. Chem. Ed., 13, 2213–2220 (1975)." which have the following structure:

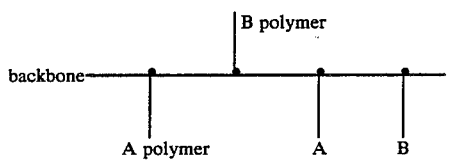

the bigraft copolymers of this invention have a particular comb-like structure.

Through the bigraft process of this invention, an existing material in different forms could be uniformly modified to balance the properties by grafting a third component (the second ethylenically unsaturated monomer), either hydrophilic or hydrophobic in nature, onto the first grafted chain. Moreover, the the bigraft copolymers are prepared with no initiator being added according to this bigraft process.

Details of the present invention can be further understood by the following examples. These example are meant to illustrate the present invention and are not to be limiting.

EXAMPLE

Preparing of the first grafted polymer:

The material used as grafting substrates include (1) low density polyethylene (LDPE) film (thickness 0.12 mm, density 0.921 g/cm$^3$ and melt index 3.0 g/10 min), (2) copolymer of ethylene and 4 mole% of vinyl acetate (EVA) (thickness 0.20 mm, density 0.926 g/cm$^3$, melt index 0.4 g/10 min), and (3) above methioned LDPE in particulate form (3 mm diameter).

Reagent grade acrylic acid (AA) (Wako Pure Chem.) was grafted onto the polymer substrates by the preirradiation grafting method, wherein the polymer substrates were irradiated by a Co-60 gamma ray and immersed into a 50 wt% aqueous solution of the acrylic acid. Details of the preirradiation grafting procedures have been reported in our previously mentioned article entitled "Preirradiation method of Acrylic and Methacrylic Acid onto Polyethylene Films; Preparation and Properties," J. Appl. Polym. Sci., 30, 1023 (1985). The prepared graft polymer was then treated according to the following steps to remove hydrophilic homopolymers and to swell the matrix.

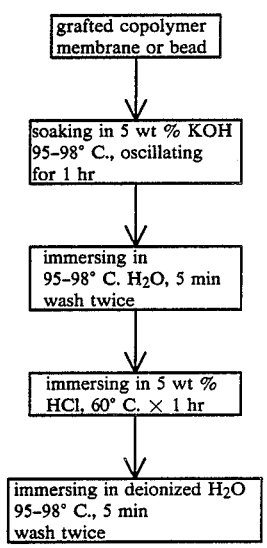

After several repeated treatments of above procedures, the graft polymer was partially dried to about 10% water content (dry base).

Oxidation:

The oxidizing reagents were prepared by addition of aqueous strong acids into 50% H$_2$O$_2$ solution at a temperature below −10° C. according to the following ratios: conc. H$_2$SO$_4$/50% H$_2$O$_2$ =7/43 (V/V), 81% methanesulfonic acid/50% H$_2$O$_2$=½ (V/V) and p-toluene sulfonic acid/50% H$_2$O$_2$=4.6/10 (w/v). The oxidation reaction of the graft polymer was performed by immersing the polymer in a well stirred solution containing the oxidizing reagent at a specified temperature. After certain period of reaction time, the polymer was taken out and then washed with a cold methanol which was cooled below −15° C. until the filtrate became free of H$_2$O$_2$ and acid.

Figure 2:
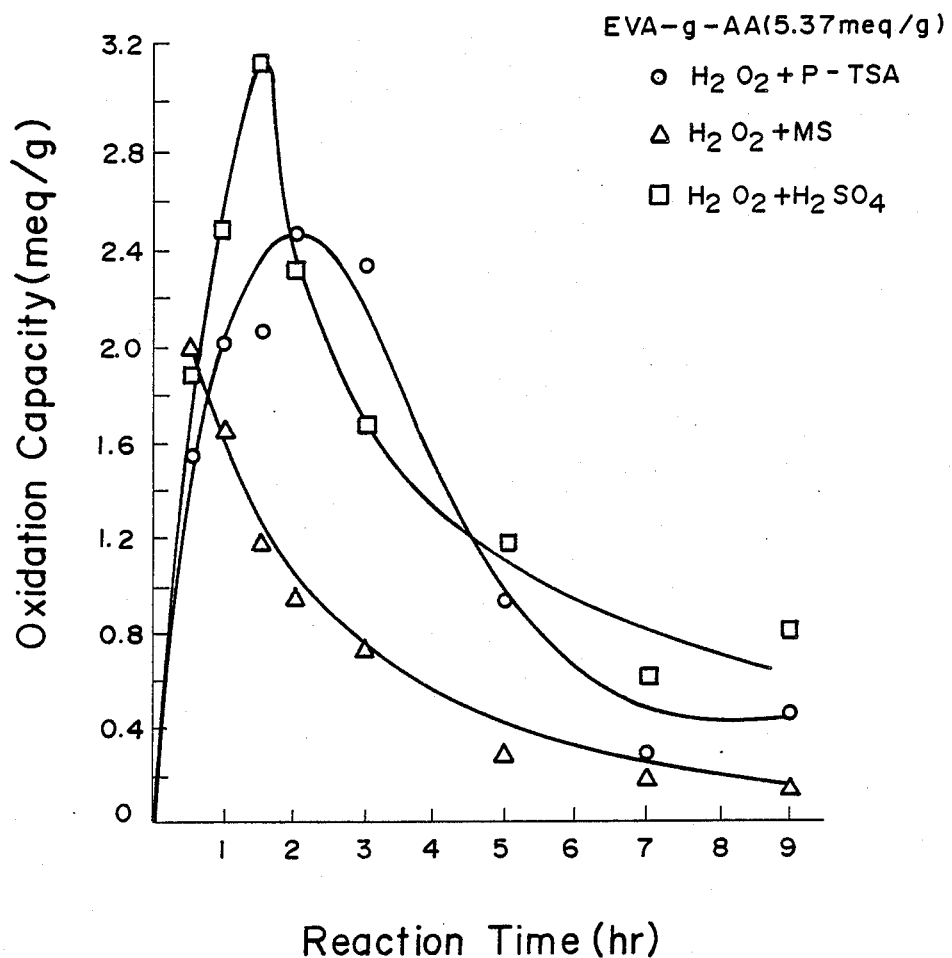
FIG. 2 is a plot of oxidation capacity vs. reaction time for EVA-g-AA (5.37 meq/g) oxidized with different acid catalysts at 60° C.
Figure 3:
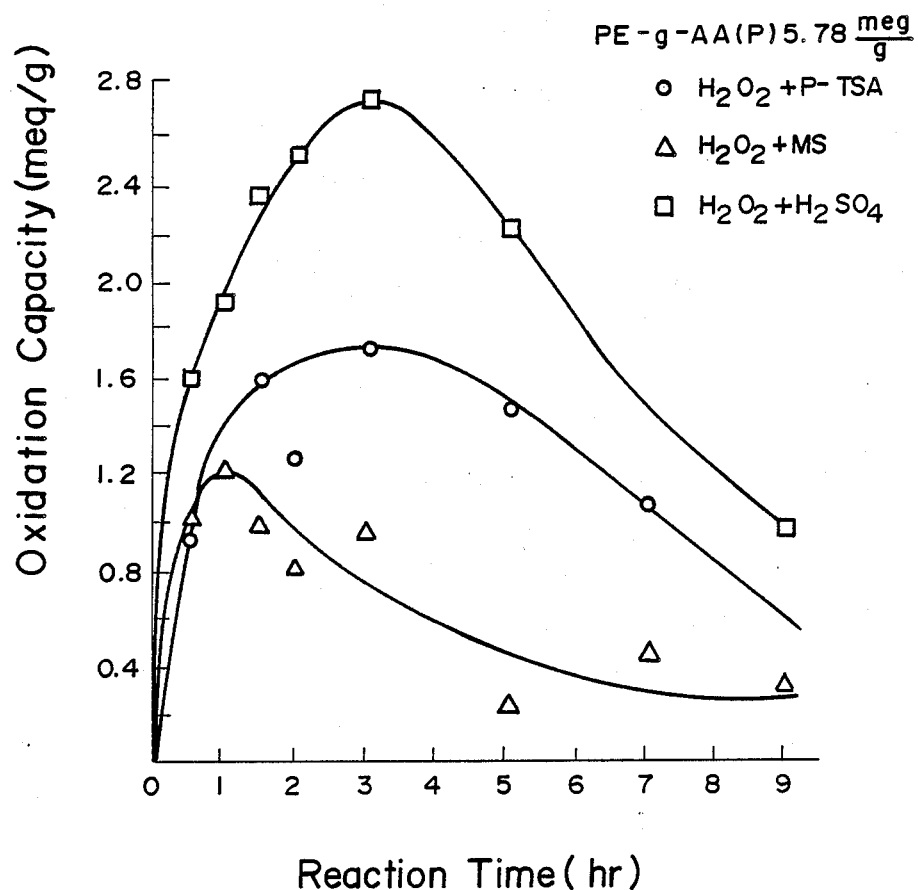
FIG. 3 is a plot of oxidation capacity vs. reaction time for particle LDPE-g-AA (5.78 meq/g) oxidized with different acid catalysts at 60° C.

The oxidation capacity of the oxidized resins were determined by reaction with aqueous KI solution (30 min at 60° C.) and titration of the generated iodine with 0.05 N sodium thiosulfate. For different polymer substrates, the plots of oxidation capacity versus reaction time for the above different strong acids are shown in FIG. 1, 2 and 3 respectively. In those figures, there is a maximun in each oxidation capacity curve during conversion to percarboxyl acid. Also, the maximum varies from curve to curve. In methanesulfonic acid, the maximum conversion is achieved at shorter reaction time.

However, their oxidation capacities are not always the highest. For LDPE-g-AA, methanesulfonic acid is found to be preferable, while in EVA-g-AA matrix, sulfuric acid seems to be more preferable than sulfonic acid. It may be noted that the matrix containing vinyl acetate (EVA) facilitates the conversion of carboxylic acid to percarboxyl acid. So the maximum oxidation capacity for EVA-g-AA are twice as much as that in LDPE-g-AA. It may be due to the hydrophilicity increment upon incorporation of vinyl acetate group, which may be hydrolyzed during cyclic swelling treatment of the grafted EVA in acid or alkaline solution.

For acrylic acid grafted film, the maximum conversion generally occurs within 2 hours of reaction at 60° C., while for particulate form resin, FIG. 3 shows that longer reaction times are required to reach maximum conversion which values are slightly lower than that for film type. The reasons are due to smaller ratio of surface area to weight.

Figure 4:
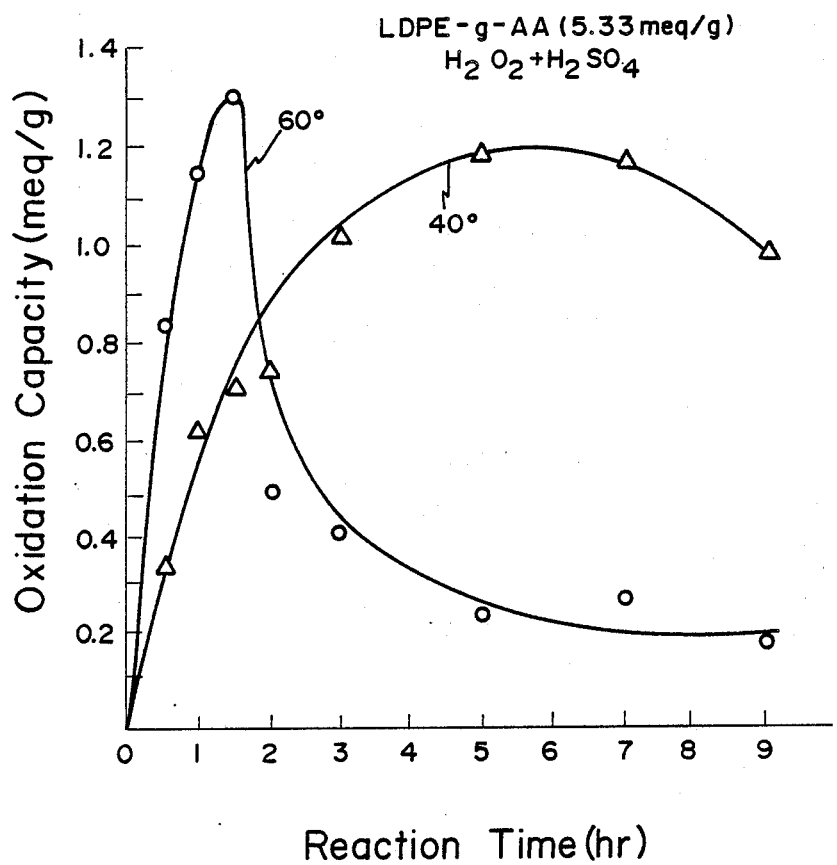
FIG. 4 is a plot of oxidation capacity vs. reaction time for LDPE-g-AA oxidized with sulfuric acid catalyst at 60° C. and 40° C. respectively.
Figure 5:
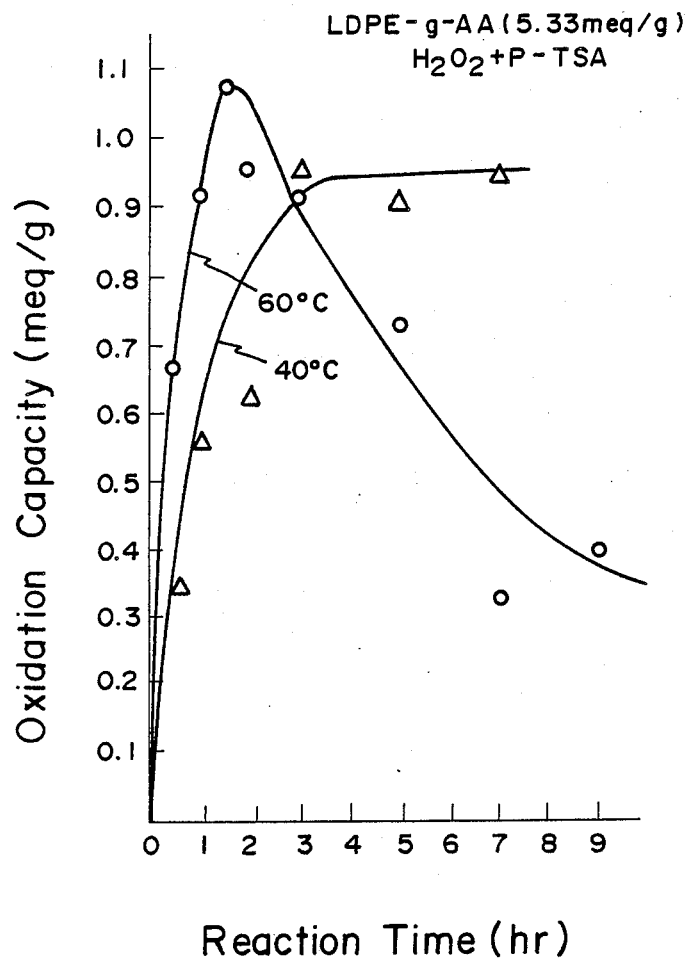
FIG. 5 is a plot of oxidation capacity vs. reaction time for LDPE-g-AA oxidized with p-toluene sulfonic acid catalyst at 60° C. and 40° C. respectively.

Since the generation and decomposition of peracid groups occur simultaneously, the reaction temperature is lowered to 40° C. to reduce the decomposition rate. In comparison with the reaction at 60° C., both oxidation capacity curves are plotted in FIGS. 4 and 5 for different acid catalysts, it manifested that 6 hours are required to reach maximum oxidation capacity, and the value of which is still slightly lower than that reacted at 60° C.

Synthesis of Bigraft Copolymers:

The peracid type of above acrylic acid grafted ethylene vinyl acetate (EVA-g-AA, EVA/AA=105/100) was immersed in a 50 wt% aqueous solution of 2-hydroxethyl methacrylate (HEMA) at a temperature about 90° C. for 2 hours. The resulting product was separated from the solution, washed with an ultrasonic cleaner for ten minutes, and washed with deionized water twice. The mechanical properties of parent EVA, EVA-g-AA, and EVA-g-AA-g-HEMAC HEMA/EVA-g-AA=560/100) are shown in the following table 1.

TABLE 1

|  | Tensile strength (kg/cm$^2$) | Breaking Strain (%) |
| --- | --- | --- |
| EVA | 111.6 | 594 |
| EVA-g-AA (105/100) | 41.2 | 268 |
| EVA-g-AA-g-HEMA (560/100) | 14.0 | 124 |

It is apparent that even though a great deal of hydrophilic monomer was grafted or included in the matrix, their mechanical properties are still acceptable for practical application because no disintegration occured when compared with conventional grafting process.

Morphology of Bigraft Membrane:

The surface profiles of the base membrane and grafted membranes were investigated by scanning electron microscopy. Micrographs taken therefrom are shown in FIG. 6. As it can be seen from micrographs FIG. 6-(a) and FIG. 6-(b), EVA-g-AA membrane has a porous structure surface. This porous structure is believed to be due to grafting of acrylic acid and extraction of homopolymer during above described acid and alkaline cycle treatment. But, after the second grafting process, this porous structure is gradually filled with the third component HEMA, as shown in FIG. 6(c) and FIG. 6-(d), and the whole surface is also covered with HEMA whose characteristics have been confirmed by contact angle measurement of the surface.

The morphology of matrix of the base membrane and grafted membranes were investigated by transmission electron microgscopy. Micrographs taken therefrom are shown in FIG. 7. In FIG. 7-(a), the amorphous region of the EVA matrix was sulfonated with chlorosulfonic acid and then stained with uranyl acetate according to Kanig technique, G. Kanig, Kolloid Z., Z. Polym., 251, 782 (1973). The white network structure is the non-sulfonated crystalline region.

After grafting with acrylic acid, the samples were also stained with uranyl acetate without pre-sulfonation. Dark region represents the hydrophilic acrylic acid grafting sites. Micrographs of the EVA-g-AA confirms that grafting occurs mainly on the crystalline surface and in amorphous region. It is also apparent that the grafted acrylic acid is uniformly distributed over the whole matrix.

The most important finding after bigraft procedure is the formation of the third circular domain arising from the third component. From FIG. 7-(d), it is clear that at higher grafting ratio the HEMA domains of around 0.2 are uniformly dispersed in the matrix. In addition, the crystalline EVA matrix still maintains its network structure which manifests that the whole matrix is greatly and evenly expanded.

We claim:

1. A process of preparing a bigraft copolymer substrate having a form of a membrane, particulate or tube comprising
    (a) graft polymerizing a first ethylenically unsaturated monomer containing a carboxyl acid group onto a polymer substrate having a form of a membrane, particulate or tube;
    (b) oxidizing the carboxyl acid groups of the resulting graft polymer into percarboxyl acid groups; and
    (c) graft polymerizing a second ethylenically unsaturated monomer onto the grafted chain of the graft polymer through the decomposition of the percarboxyl acid.

2. The process according to claim 1, wherein the graft polymerization in step (a) is carried out by a preirradiation method.

3. The process according to claim 1, wherein the first ethylenically unsaturated monomer is selected from acrylic acid, methacrylic acid, ethylacrylic acid, crotonic acid, propiolic acid, or styrene carboxyl acid.

4. The process according to claim 1, wherein the polymer substrate having a form of a membrane, particulate or tube is cast or molded from an addition polymer or copolymer.

5. The process according to claim 4, wherein the addition polymer or copolymer is an olefinic polymer or copolymer.

6. The process according to claim 1, wherein the monomer containing a carboxyl acid group is prepared by hydrolyzing a monomer containing a carboxyl acid ester group.

7. The process according to claim 1, wherein the oxidation reaction in step (b) is carried out by treating the resulting graft polymer of step (a) with an oxidizing agent in the presence of an acid catalyst.

8. The process according to claim 7, wherein the oxidizing agent is an aqueous solution of hydrogen peroxide, and the acid catalyst is selected from the group consisting of sulfuric acid, methane sulfonic acid, and p-toluene sulfonic acid.

9. The process according to claim 8, wherein the oxidation reaction is carried out at a temperature of 5°–100° C. for a period of 5 minutes to about 5 hours.

10. The process according to claim 1, wherein the second ethylenically unsaturated monomer is selected from the group consisting of styrene, methyl methacrylate, vinyl acetate, 2-hydroxyethyl methacrylate, vinyl pyridine, and vinyl pyrrolidone.

11. The process according to claim 1, wherein the graft polymerization in step (c) is carried out by immersing the oxidized graft polymer of step (b) in a solution of the second ethylenically unsaturated monomer.

12. The product obtained by the process of claim 1.

13. The product obtained by the process of claim 9.

14. The product of claim 12 which has a comb-like structure.

15. The product of claim 13 which has a comb-like structure.